United States Patent [19]

Bell

[11] Patent Number: 4,705,319

[45] Date of Patent: * Nov. 10, 1987

[54] SEAT RECLINER MECHANISM WITH SPRING COIL ACTUATOR AND CREEP ELIMINATOR FEATURE

[75] Inventor: Robert L. Bell, Oxford, Mich.

[73] Assignee: Fisher Dynamics Corporation, St. Clair Shores, Mich.

[*] Notice: The portion of the term of this patent subsequent to Aug. 18, 2004 has been disclaimed.

[21] Appl. No.: 776,362

[22] Filed: Sep. 16, 1985

Related U.S. Application Data

[63] Continuation-in-part of Ser. No. 753,047, Jul. 1, 1985.

[51] Int. Cl.4 ............................................. B60N 1/02
[52] U.S. Cl. .................................... 297/362; 297/374; 297/379
[58] Field of Search ............... 297/361, 362, 374, 378, 297/379, 354, 355, 366–369; 188/77 R, 77 W

[56] References Cited

U.S. PATENT DOCUMENTS

| | | |
|---|---|---|
| 1,574,333 | 2/1926 | Ackerman et al. . |
| 2,073,408 | 3/1937 | Litchfield . |
| 2,750,993 | 6/1956 | McGregor ...................... 297/374 X |
| 2,751,773 | 6/1956 | Woodson . |
| 2,802,516 | 8/1957 | Liljeugren ............................ 297/374 |
| 3,042,449 | 7/1962 | Hutchinson et al. ............... 297/366 |
| 3,064,766 | 11/1962 | Hanizeski . |
| 3,115,217 | 12/1963 | Butler . |
| 3,236,120 | 2/1966 | Fender . |
| 3,285,657 | 11/1966 | DeGaston ............................ 297/374 |
| 3,517,965 | 6/1970 | Cowles et al. . |
| 3,915,268 | 10/1975 | MacDonald . |
| 4,241,813 | 12/1980 | *Van DeSompele ............... 188/77 R |
| 4,278,032 | 7/1981 | Kritske . |
| 4,303,208 | 12/1981 | Tanaka . |
| 4,384,637 | 5/1983 | Rinkle ............................... 188/77 R |
| 4,573,738 | 3/1986 | Heesch ................................ 297/362 |

FOREIGN PATENT DOCUMENTS

| | | | |
|---|---|---|---|
| 320107 | 12/1902 | France ............................ 188/77 W |
| 1458733 | 10/1966 | France ................................ 297/366 |

Primary Examiner—Francis K. Zugel
Attorney, Agent, or Firm—Harness, Dickey & Pierce

[57] ABSTRACT

A recliner mechanism particularly adapted for motor vehicle seats is described. In accordance with this invention, the adjusted position of the seat back is controlled by using a recliner mechanism which includes a coil spring clutch which is selectively tightened or loosened around an actuator clutch drum. The upper recliner structure has a toothed quadrant which meshes with a recliner gear which rotates the rotating actuator clutch drum. A lever is employed to cause relative rotation between a pair of actuator cam plates which are connected to extending ends of a coil clutch spring. Movement of the actuator lever selectively causes the coil clutch spring to tighten or loosen around the actuator clutch drum. In accordance with another feature of this invention, a redundant positioning pawl is provided which prevents unrestrained motion of the upper recliner structure in the event of a failure or improper operation of the coil spring clutch actuator. The tendency of the recliner to "creep" when subjected to shock loading and vibration is eliminated by the use of a spring which biases the cam plates to the engaged position.

7 Claims, 7 Drawing Figures

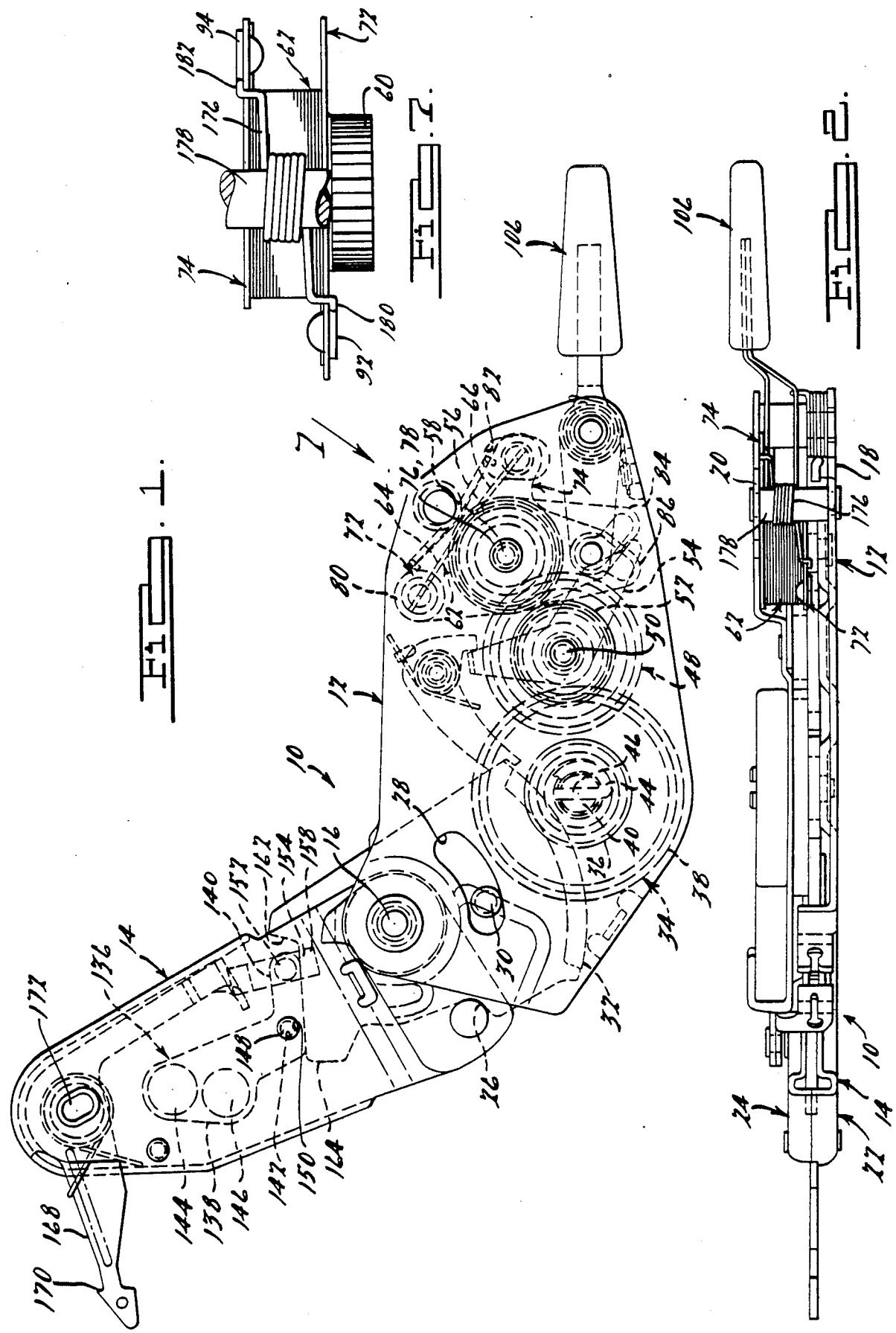

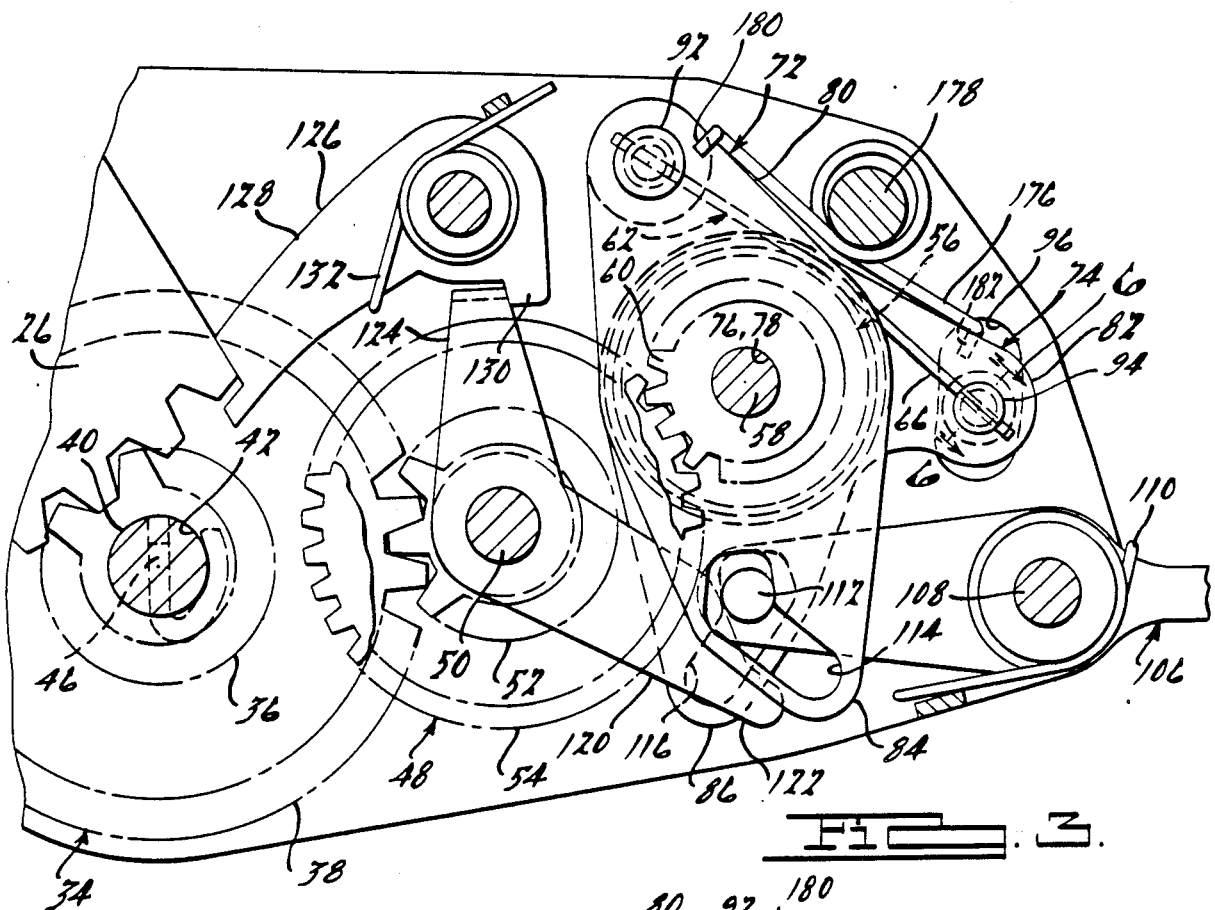
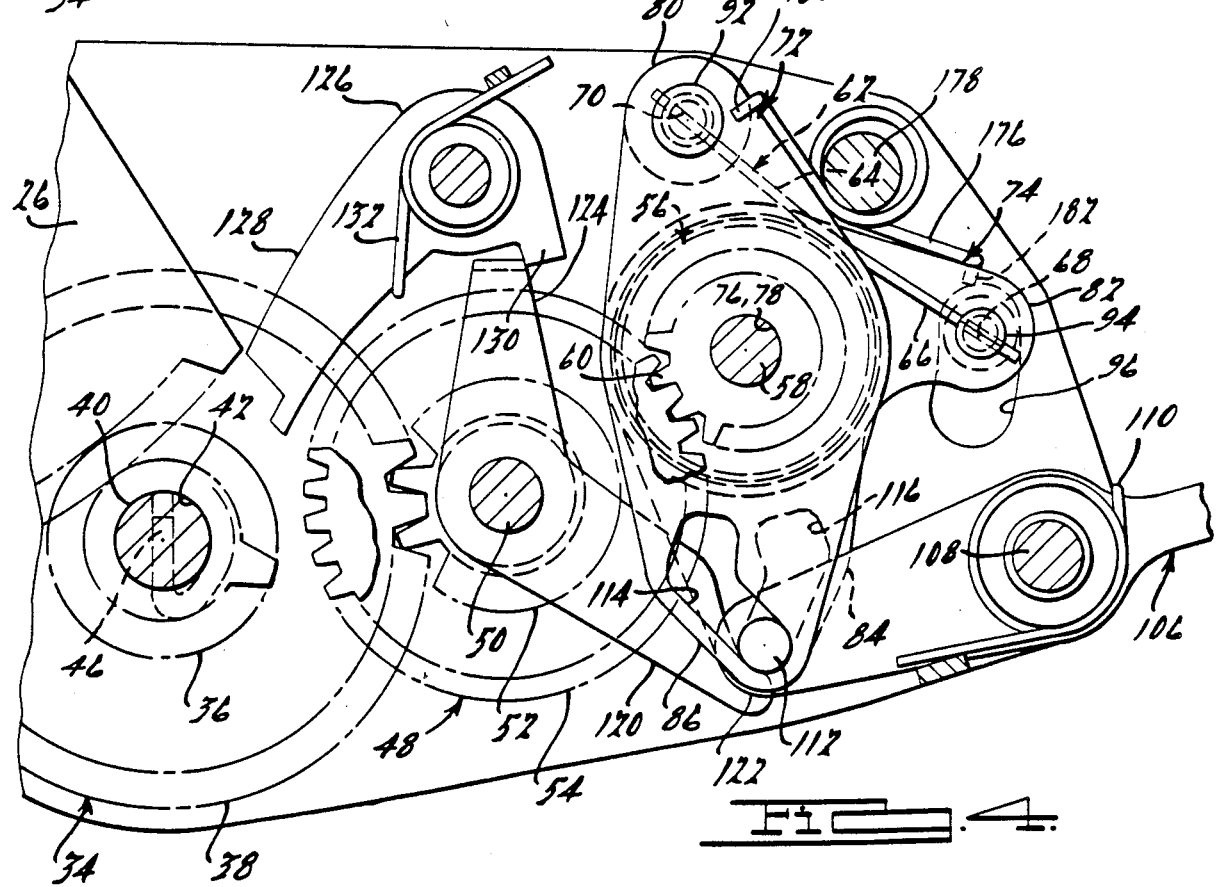

SEAT RECLINER MECHANISM WITH SPRING COIL ACTUATOR AND CREEP ELIMINATOR FEATURE

CROSS REFERENCE TO RELATED APPLICATION

This application is a continuation-in-part of application Ser. No. 753,047, filed July 1, 1985, and assigned to the assignee of this application.

BACKGROUND AND SUMMARY OF THE INVENTION

This invention relates to a seat recliner mechanism and, more particularly, to a motor vehicle seat recliner mechanism which permits the angle of the seat back relative to the seat bottom to be varied as desired by the seat occupant.

Many motor vehicles now feature seat recliner mechanisms which provide added comfort and convenience for vehicle occupants. Numerous types of seat recliner mechanisms are known to the prior art. For example, U.S. Pat. No. 4,372,610, issued to A. J. Fisher III et al on Feb. 8, 1983, described a recliner mechanism having a pair of meshing straight toothed racks. One of the racks is connected to the upper recliner structure through a quadrant component. Adjustment of the seat reclined angular position is accomplished by changing the meshed position of one rack with respect to the other. Patent application Ser. Nos. 589,229 filed Mar. 14, 1984, and 594,742 filed Mar. 29, 1984, both assigned to the assignee of this application, relate to improvements in such recliner mechanisms. Patent application Ser. Nos. 602,370 filed Apr. 20, 1984, and 632,597 filed July 19, 1984, also assigned to the assignee of this application, describe recliner mechanisms employing rotating gears for seat recliner position adjustment.

Although devices in accordance with the above-entitled patents and patent applications perform satisfactorily, it is desirable to provide further improvements in the design of seat recliner mechanisms. Many of the currently known seat recliner mechanism designs employ meshing teeth for position fixing which provide stepped changes in adjusted angular positions so that fine adjustment of the reclined position is impossible. it is therefore desirable to provide a seat recliner mechanism featuring continuously variable adjusted seat back angular positions so that the user is not constrained to certain fixed angular positions dictated by the recliner mechanism. Many currently known seat recliner mechanisms produce annoying clattering or "ratcheting" sounds during adjustment. It is therefore desirable to provide a seat recliner mechanism which provides silent operation and has smooth release characteristics. Another desirable characteristic for a motor vehicle seat recliner is the ability to prevent unrestrained pivoting motion of the seat back in the event of failure or improper operation of the seat recliner mechanism. Designers are further constantly striving for ease of production, low cost, simplicity, and reliability of all motor vehicle hardware components. Finally, a seat recliner mechanism should maintain a desire reclined position despite being subjected to shock loadings and vibration.

The above described features for a motor vehicle seat recliner mechanism are provided in accordance with this invention. The recliner described in detail below has a gear transmission coupled to a spring clutch actuator device which fixes the angular position of the seat back. In a preferred embodiment of this invention, a curved toothed rack is provided which rotates with the upper recliner mechanism and meshes with a rotatable gear in the lower recliner mechanism. One or more additional gears are employed to rotatably drive a drum. Fixing of the seat reclined position is achieved by providing, a coil spring clutch which wraps around the drum, and an actuation mechanism which selectively tightens or loosens the coil spring clutch around the drum to either restrain or permit drum rotation. The recliner mechanism according to this invention further includes a redundant positioning pawl which acts in conjunction with the coil spring actuator to restrain pivoting motion of the upper recliner structure. This redundant positioning pawl prevents unrestrained motion of the seat back in the event of failure or improper operation of the spring clutch actuator. A creep eliminator spring is provided which urges the coil spring clutch to be tightly wrapped around the drum to prevent the adjusted position of the seat recliner mechanism from changing once it is adjusted to a desired postiion due to shock loadings and vibration.

The recliner mechanism according to this invention is usable for motor vehicle seats which are installed in two or four door type cars, as well as for other types of motor vehicles. In four door car models, the front seat back typically does not need to be folded forward to permit access to the rear seat occupant area. However, for two door designs having a rear seat occupant area, such provisions are usually necessary. Therefore, this invention is described in conjunction with an inertia sensitive seat back locking device according to prior art designs which normally permits the front seat back to be folded forward but acts to prevent folding when the vehicle is subjected to deceleration above a predetermined level. The inertia sensitive seat back locking system described in conjunction with this invention and various similar devices are detailed by several of the previously mentioned U.S. patents and applications.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a side elevational view of the seat recliner mechanism according to the present invention;

FIG. 2 is a plan view of the seat recliner mechanism shown in FIG. 1;

FIG. 3 is a partial side elevational view of the seat recliner mechanism shown in FIG. 1 particularly illustrating the spring clutch actuator in an engaged position;

FIG. 4 is a side elevational view of the recliner shown in FIG. 1 particularly showing the spring clutch actuator in a released position;

FIG. 7 is a view taken in the direction of arrow 7 in FIG. 1 particularly showing the creep eliminator spring in accordance with this invention.

DETAILED DESCRIPTION OF THE INVENTION

Figure 6:
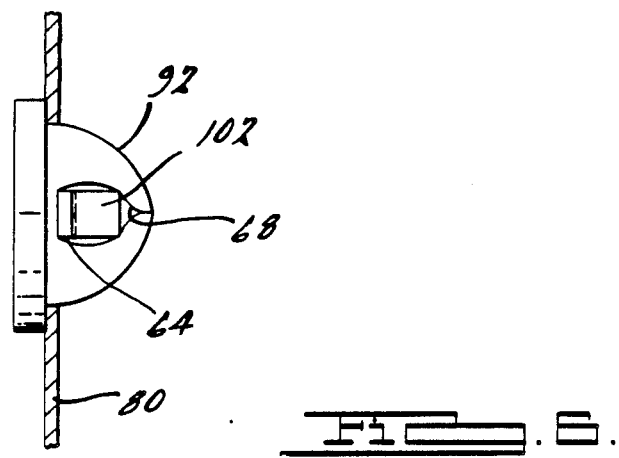
FIG. 6 is a cross-sectional view taken along line 6—6 of FIG. 3 particularly showing the rivet used for restraining the coil clutch spring ends.

A motor vehicle seat recliner mechanism according to this invention is shown assembled in FIGS. 1 through 4 and is generally designated by reference character 10. The embodiment of recliner mechanism 10 described herein by the accompanying Figures is intended to be positioned at the lefthand side of a motor vehicle's driver's seat. A recliner structure useful for a front passenger's seat would preferably employ components which are mirror image replications or are oriented differently than those described herein. Seat recliner mechanism 10 includes lower recliner structure 12 which becomes attached to a seat bottom frame (not shown). Upper recliner structure 14 becomes attached to a seat back frame (now shown) and is adapted to pivot with respect to lower structure 12 about pivot pin 16. Lower recliner structure 12 is fabricated by attaching two plates, inner lower recliner plate 18 and outer lower recliner plate 20. These plates are attached together by rivets or by welding and define a space therebetween which accommodates additional components which are described below. Upper recliner structure 14 is similarly fabricated by attaching two plates, inner upper recliner plate 22 and outer upper recliner plate 24. These plates are also formed to define a space therebetween.

Quadrant 26 is rotatable about pivot pin 16. The position of quadrant 26 establishes the angular position of upper recliner structure 14 with respect to lower recliner structure 12, and therefore between the seat back and bottom. As shown by the Figures, quadrant 26 includes arcuate slot 28. Pin 30 is attached to lower recliner structure 14 and travels within slot 28 to limit the maximum extent of the angular range of adjustment of the upper recliner structure. For four door style motor vehicles, or for other applications wherein a seat back folding mechanism is unnecessary, quadrant 26, or its functional equivalent may be fastened directly to upper recliner structure 14, or can be made integrally therewith.

In accordance with a principal feature of this invention, quadrant 26 includes curved toothed rack 32 along its lower edge. Toothed rack 32 is formed along a circular path having its center about pivot pin 16. First recliner gear 34 is attached to lower recliner structure 12 and meshes with toothed rack 32. Preferably, first gear 34 includes a stepped external surface forming gear sections 36 and 38 having differing diameters. As shown in FIG. 1, gear section 36 has a smaller diameter than that of section 38. First gear 34 is rotatably attached to the lower recliner structure 12 by permitting pin 40, which is fixed to the gear, to rotate in bores 42 of lower recliner structure plates 18 and 20. First gear 34 is positioned so that toothed rack 32 meshes with gear section 36, thereby causing rotation of the gear as the angular position of the quandrant 26 (and hence the upper recliner structure 14) is changed with respect to lower recliner structure 12. Rotational biasing is applied to upper recliner structure 14 through the use of torsion spring 44 having an inner end which engages with slot 46 of pin 40. A radially outer end of torsion spring 44 is grounded to the lower recliner structure 12 at any convenient point. This rotational biasing enables the seat occupant to easily and conveniently adjust the seat back position by pushing against the seat back when the actuator is released until the desired angular position is reached.

Second recliner gear 48, like first gear 34, is journalled for rotation within lower recliner structure 12 and rotates about pin 50 within lower recliner structure 12. Second recliner gear 48 defines a pair of gear sections 52 and 54 of differing diameters wherein section 54 has a larger diameter than diameter section 52. Diameter section 52 of second recliner gear 48 meshes with section 38 of first recliner gear 34, as best shown in FIGS. 1, 3 and 4.

Figure 5:
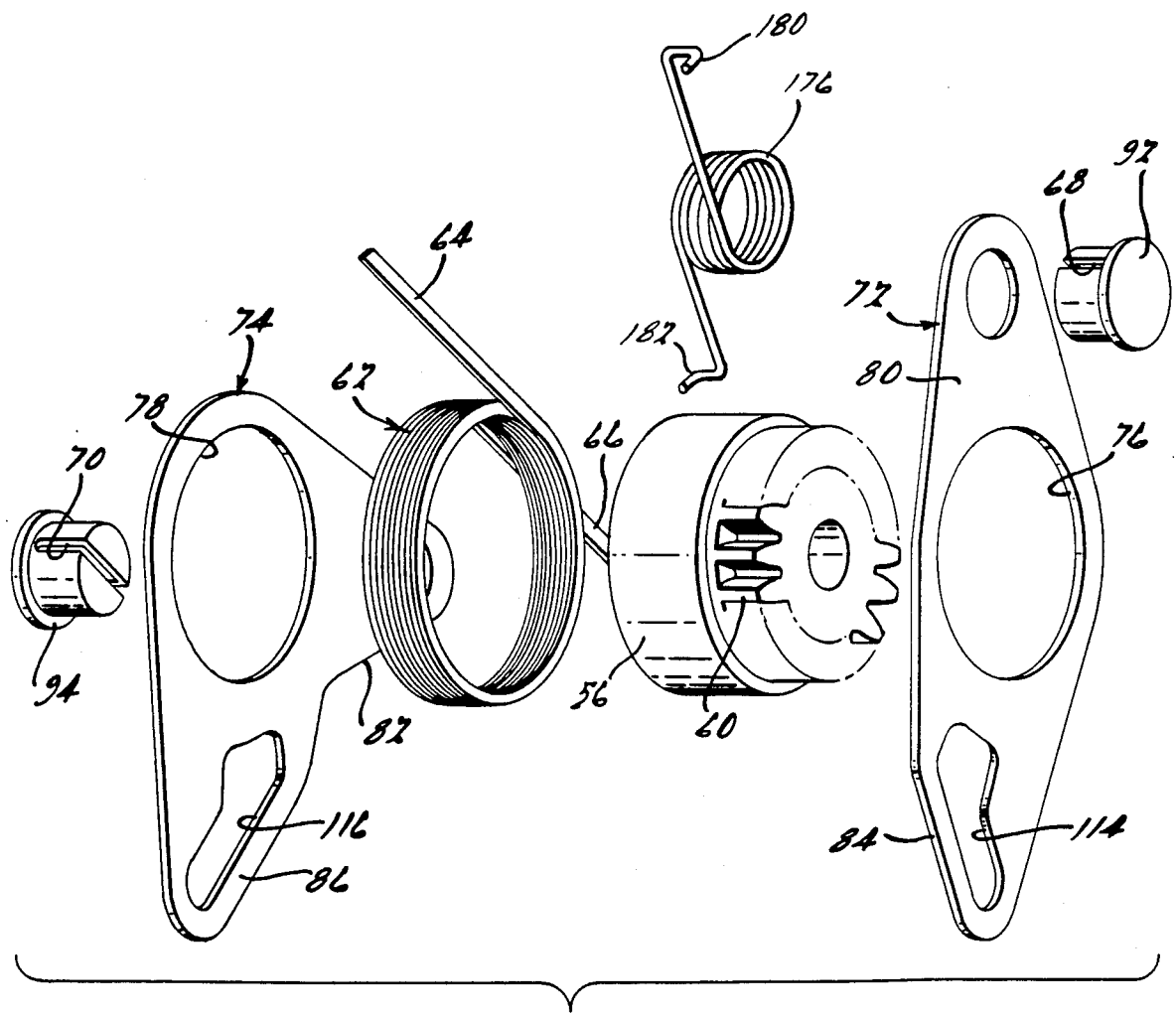
FIG. 5 is an exploded pictorial view of the components of the spring clutch actuator according to the invention.

The spring clutch actuator of recliner 10, best shown in Figure 5, includes actuator clutch drum 56 which is journalled for rotation within lower recliner structure 12 about pivot pin 58. Actuator clutch drum 56 defines a relatively smooth cylindrical exterior surface (although it may be roughened to achieve the desired frictional characteristics). Actuator clutch drive gear 60 is fixed for rotation with actuator clutch drum 56 (or is integral therewith) and meshes with section 54 of second recliner gear 48. The meshing relationship of gears 34, 48, and 60 provides a transmission which minimizes the restraining torque necessary upon actuator clutch drum 56 needed to restrain motion of upper recliner structure 14 is response to high torque loads exerted on the upper recliner structure.

Rotation of actuator clutch drum 56 is selectively controllable by employing coil clutch spring 62 which wraps around drum 56 and includes a pair of extending pigtail ends 64 and 66. By changing the relative angular positioning of ends 64 and 66, spring 62 is caused to selectively frictionally engage or disengage actuator clutch drum 56. When ends 64 and 66 are moved to increase the angle of wrap of coil clutch spring 62 around actuator clutch drum 56, the diameter of the spring decreases so that it tightly engages the drum and restrains its rotation by friction. Conversely, when the angle of wrap of coil clutch spring 62 around clutch drum 56 is increased by movement of ends 64 and 66, the spring loosens its grip on the drum and it may be rotated freely. Spring 62 is wound so that it normally tightly wraps around drum 56 in the absence of forces exerted on ends 64 and 66.

The actuation system which controls the angular relationship between ends 64 and 66 of coil clutch spring 62 will now be described. A pair of actuator cam plates 72 and 74, each having bores 76 and 78 respectively, are journalled for relative rotation about pivot pin 58 or clutch drum 56. Actuator cam plates 72 and 74 include spring engaging arms 80 and 82 and actuator lever arms 84 and 86. Rivets 92 and 94 which include slots 68 and 70 receive spring pigtal ends 64 and 66. FIG. 6 shows rivet 92 in detail and is exemplary of both rivets. Gripper blocks 102 are provided to firmly engage spring ends 64 and 66, and have a roughened surface which bites into the spring ends. When rivet 92 is deformed as shown in FIG. 6, gripper block 102 securely engages spring end 64. An additional slot 96 is provided within lower recliner structure 12 to prevent interference with rivet 94.

The relative angular positioning of actuator cam plates 72 and 74, and hence ends 64 and 66 of coil clutch spring 62, is controlled through movement of actuator lever 106 which is pivoted for rotation with respect to lower recliner structure 12 about pivot pin 108. Actuator lever 106 is biased toward a normal engaged position shown in FIG. 1 through use of coil torsion spring 110. Drive pin 112 is attached to actuator lever 106 and is caused to move along a circular path as actuator lever 106 is rotated. Drive pin 112 moves within a pair of cam slots 114 and 116 defined by actuator cam plate arms 84 and 86. Movement of actuator lever 106 between a disengaged and engaged position is depicted in detail in FIGS. 3 and 4.

FIG. 3 illustrates the normal engaged position of the components wherein the position of upper recliner structure 12 is fixed. In this position, drive pin 112 is acting on cam slots 114 and 116 and permits cam plates 72 and 74 to be moved in a direction which wraps pigtail ends 64 and 66 around actuator clutch drum 56 which decreases the diameter of coil clutch spring 62 causing it to firmly frictionally engage actuator clutch drum 56. Since spring 62 normally tightly wraps around drum 56, drive pin 112 does not forceably cause the spring to restrain motion of the drum. In a well-known manner, such clutch springs tend to increase their degree of frictional engagement with the associated friction surface as rotational torque is applied since such frictional engagement further tends to increase the contact force between the spring and surface and therefore the frictional restraining force provided. Therefore, the interaction of coil clutch spring 62 and actuator drive drum 56 comprises a self-energizing clutch mechanism. Cam slots 114 and 116 are conformed to provide for a slight degree of lost motion which occurs as spring 62 deforms in response to applied torques. For example, with respect to the orientation of elements shown in FIG. 3, as the motor vehicle user exerts his or her weight against the seat back and against the upper recliner structure 14, a counterclockwise directed torque load is applied about pivot pin 16. This load translates into a clockwise directed torque applied to actuator clutch drum 56. If such torque is sufficiently great, deformation of coil clutch spring 62 results. In this condition, actuator cam plate 72 is loaded to restrain rotation and transfers load through drive pin 112. Actuator cam plate 74 is unloaded (since spring 62 normally tightly wraps around drum 56) and is provided with the ability to move rotationally a small extent in order to prevent it from exerting a force on spring end 66 which would tend to loosen the grip of coil clutch spring 62 on actuator clutch drum 56. Similarly, when an oppositely directed torsional load is applied to actuator clutch drum 56, actuator cam plate 72 is permitted to move slightly with respect to drive pin 112.

FIG. 4 shows the position of the components when actuator lever 106 is rotated in a counterclockwise (released) direction. In this position, drive pin 112 interacts with cam slots 114 and 116 to rotate pigtail ends 64 and 66 angularly toward one another, which has the effect of increasing the effective diameter of coil clutch spring 62, thereby releasing actuator clutch drum 56 for rotation and enabling a changing in the angular positioning of the upper recliner structure 14.

With particular reference to FIGS. 3, 4, and 7, seat recliner mechanism 10 further includes coil torsion type creep eliminator spring 176 which is positioned by pin 178 between inner and outer lower recliner plates 18 and 20. Creep eliminator spring 176 has a pair of hook shaped ends 180 and 182 which act upon actuator cam plates 72 and 74, respectively to urge the cam plates in a direction of tightening the wrap of coil clutch spring 62 around actuator clutch drum 56. Use of spring 176 has been found to eliminate "creep" or the tendency of drum 56 to slip within coil clutch spring 62 when recliner mechanism 10 is subjected to repeated loadings. When actuator lever 106 is moved to the released position shown in FIG. 4, creep eliminator spring 176 is overcome to permit movement of cam plates 72 and 74 to their released position.

Seat recliner mechanism 10 according to this invention further provides a redundant positioning feature which acts to restrain uncontrolled motion of upper recliner structure 14 in the event of a failure or improper operation of the coil spring actuator. Redundant positioning lever 120 is rotatably pivotable about pivot pin 50 and includes arm 122 which contacts drive pin 112 and further defines arm 124. Redundant positioning pawl 126 is pivotably connected to lower recliner structure 12 and includes a pair of ends 128 and 130. End 130 engages arm 124 causing pawl 126 to be moved between quadrant engaging and quadrant disengaging positions. Redundant positioning pawl 126 is resiliently biased toward a quadrant engaging position by coil torsion spring 132. FIG. 3 illustrates the position of the components in the normal engaged position. In this condition, end 128 of redundant positioning pawl 126 is positioned in the path of motion of quadrant 26 such that it can be moved only to the position shown in FIG. 3 and not to a further rotated position, thus preventing unrestrained motion in the event of failure of the spring clutch actuator system. The user may rotate the upper recliner structure 14 to a more reclined position only if redundant positioning pawl 126 is moved out of the path of motion of quadrant 26 which occurs when actuator lever 160 is moved to the disengaged position shown in FIG. 4. In this position, the interaction between drive pin 112 and arm 122 of lever 120 causes the lever to be moved in a clockwise direction, moving arm 124 to engage with end 130 of pawl 126, causing it to be moved counterclockwise and out of the path of motion of quadrant 26. The angular position at which redundant positioning pawl 126 engages quadrant 26 corresponds to a reclined angular position which will permit the driver to continue operation of the associated motor vehicle, thereby enabling it to be driven until repairs to recliner 10 can be undertaken or until normal functioning of the mechanism is restored.

For use in two-door car models, motor vehicle seat recliner 10 according to this invention further features inertia sensitive actuator 136 which prevents forward rotation of the seat back during conditions of sudden deceleration of the associated motor vehicle. Inertia sensitive actuator 136 of vehicle recliner 10 interacts with quadrant 26 and responds to vehicle deceleration to prevent forward rotation of the seat back. Actuator 136 includes upper weighted section 138 and lower engaging portion 140 with bore 142 therebetween. Upper weighted section 138 includes weights 144 and 146. Pivot pin 148 is attached to upper recliner structure 14, passes through bore 150, and cooperates to form a low friction bearing permitting free rotation of actuator 136. The actuator 136 is configured such that its centroid of mass (center of gravity) lies above pivot pin 148 so that, upon vehicle deceleration, actuator 136 is caused to rotate in a clockwise direction with respect to the orientation shown by FIG. 1. Engaging portion 140 of actuator 136 supports engaging pin 152. Engaging pin 152 is retained in association with engaging section 140 since it is trapped between locally deformed portions 154 and 156 (not shown) which forms slots 158 and 160 (not shown) respectively within upper recliner plates 22 and 24. Quandrant 26 includes a notched upper portion defining stop surface 162. Therefore, when a predetermined level of vehicle deceleration is sensed by actuator 136, the forward movement of upper recliner structure 14 is limited due to engagement between engaging pin 152 and stop surface 162. Forward movement of upper recliner structure 14 in this situation is prevented due to engagement of engaging pin 152 with stop surface 162 of quadrant 26 and the edges of slots 158 and 160. Under normal circumstances, the seat back may be freely rotated forward since engaging pin 152 is permitted to escape engagement with surface 162. Such escapement is provided by placement of the centroid of mass (center of gravity) of actuator 136 such that the actuator is normally biased by gravity in a counterclockwise (disengaging) direction.

In order to provide enhanced reliability of engagement between actuator 136 and stop surface 162, quadrant surface 164 is provided which contacts the actuator so that is is biased in an engaged position when the seat back is in its rearmost position. Slight forward rotation of the seat back relieves this bias and enables actuator 136 to either cause engaging pin 152 to escape engagement with stop surface 162, or engage with the stop surface in response to vehicle deceleration. The above description of inertia sensitive actuator 136 is for illustrative purposes only. Many designs for such mechanisms are known to the art and could be employed in conjunction with this invention with equal success.

An emergency releasing mechanism is provided to enable rear seat occupants to extract themselves from the vehicle in the event of failure of the inertia sensitive components of the seat recliner or in the event that vehicle inclination causes the hinge mechanism to latch. Therefore, release actuator 168 is provided having a rearwardly projecting portion 170 which may be rotated about pivot pin 172 by the rear seat occupants so that inertia sensitive actuator 136 is caused to rotate in a counterclockwise position about pivot pin 148, thereby withdrawing engaging pin 152 from engagement with stop surface 162 and permitting the seat back to be folded forward.

While the above description constitutes the preferred embodiments of the present invention, it will be appreciated that the invention is susceptible to modification, variation and change without departing from the proper scope and fair meaning of the accompanying claims.

What is claimed is:

1. A seat recliner mechanism for supporting a seat back and a seat bottom which permits the angle therebetween to be controllably varied comprising:
   a lower recliner structure supporting said seat bottom,
   an upper recliner structure supporting said seat back,
   a first pivot rotatably attaching said lower recliner structure to said upper recliner structure,
   a toothed rack operatively connected to one of said upper or lower recliner structures,
   gear means carried by the other of said upper or lower recliner structures for engaging said toothed rack and controlling the positioning of said toothed rack,
   an actuator clutch drum carried by the other of said upper or lower recliner structures and rotatably driven by said gear means,
   a unitary coil clutch spring wrapping around said actuator clutch drum, said coil clutch spring having first and second spring ends,
   first spring engaging means carried by the other of said upper or lower recliner structures for engaging said first spring end,
   second spring engaging means carried by the other of said upper or lower recliner structures for engaging said second spring end,
   actuation means carried by the other of said upper or lower recliner structures for producing relative movement between said first and second spring engaging means thereby moving said first and second spring ends from an engaged position in which said coil clutch spring frictionally engages said clutch drum such that said first spring engaging means restrains rotation of said actuator clutch drum in a first rotational sense and said second spring engaging means restrains rotation of said clutch drum in a second rotational sense wherein the relative angular positioning between said lower and upper recliner structures is established, to a disengaged position in which said coil clutch spring frictionally disengages said actuator clutch drum wherein the relative angular positioning between said lower and upper recliner structures is adjustable, and
   spring means urging said spring engaging means to said engaged position.

2. The seat recliner mechanism according to claim 1 wherein said spring means is a coiled torsion spring having a pair of extending arms which act upon said spring engaging means.

3. The seat recliner mechanism according to claim 2 wherein said spring means is supported within said lower recliner structure by a pin.

4. The seat recliner mechanism according to claim 1 wherein said first and second spring engaging means comprise first and second cam plates which are rotatable about the axis of rotation of said actuator clutch drum, and said cam plates each having spring engaging arms which engage said coil clutch spring ends.

5. A seat recliner mechanism supporting a seat back and a seat bottom which permits the angle therebetween to be controllably varied comprising:
   a lower recliner structure supporting said seat bottom,
   an upper recliner structure supporting said seat back,
   a first pivot rotatably attaching said lower recliner structure to said upper recliner structure,
   a toothed rack operatively connected to said upper recliner structure,
   a first gear carried by said lower recliner structure meshing with said toothed rack,
   a second gear carried by said lower recliner structure meshing with said first gear,
   a coil spring clutch actuator including an actuator clutch drum carried by said lower recliner structure, an actuator clutch drum drive gear meshing with said second gear, said first gear said second gear and said actuator clutch drive gear providing a gear transmission which produces a torque applied to said actuator clutch drum which is less than that applied to said first gear by said toothed rack, and a coil clutch spring wrapping around said actuator clutch drum, sid coil clutch spring having first and second extending ends,
   first and second cam plates rotatable about the axis of rotation of said actuator clutch drum, said actuator cam plates each having spring engaging arms engaging said coil clutch spring ends and having actuator lever arms defining cam surfaces,
   a movable actuation lever having a drive pin which interacts with said actuator lever arm cam surfaces to move said actuator cam plates between positions of frictional engagement and disengagement of said coil clutch spring with said actuator clutch drum, spring means urging said cam plates to said engaged position, and a redundant positioning pawl movable between positions of engagement and disengagement with said toothed rack in response to movement of said actuator lever for restraining angular movement of said upper recliner structure with respect to said lower recliner structure in the event of failure or improper operation of said coil spring clutch actuator.

6. The seat recliner mechanism according to claim 5 wherein said spring means is a coiled torsion spring having a pair of extending arms which act upon said cam plates.

7. The seat recliner mechanism according to claim 6 wherein sand spring means is supported within said lower recliner structure by a pin.

* * * * *